US 6,304,962 B1

(12) United States Patent
Nair (10) Patent No.: US 6,304,962 B1
(45) Date of Patent: Oct. 16, 2001

(54) METHOD AND APPARATUS FOR PREFETCHING SUPERBLOCKS IN A COMPUTER PROCESSING SYSTEM

(75) Inventor: Ravindra K. Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/324,292

(22) Filed: Jun. 2, 1999

(51) Int. Cl.$^7$ ............... G06F 9/305; G06F 9/38; G06F 9/42; G06F 9/32; G06F 9/355
(52) U.S. Cl. ............ 712/240; 712/237; 712/239; 712/206; 712/207; 712/23; 711/137; 711/128; 711/204; 711/207; 711/213; 711/212
(58) Field of Search .................. 712/219, 218, 712/240, 238, 217, 239, 201, 41, 42, 242, 243, 215, 23, 24, 207, 206, 223, 233, 234, 237, 244, 245, 248; 711/216, 213, 204, 205, 206, 207, 137, 128, 218, 212

(56) References Cited

U.S. PATENT DOCUMENTS

| 5,136,696 | 8/1992 | Beckwith et al. ............ 712/240 |
| 5,163,140 | * 11/1992 | Stiles et al. ............ 712/240 |
| 5,179,673 | 1/1993 | Steely, Jr. et al. ............ 712/239 |
| 5,276,882 | 1/1994 | Emma et al. ............ 712/240 |
| 5,283,873 | 2/1994 | Steely, Jr. et al. ............ 712/207 |
| 5,313,634 | 5/1994 | Eickemeyer ............ 712/240 |
| 5,355,459 | 10/1994 | Matsuo et al. ............ 712/242 |
| 5,442,756 | * 8/1995 | Grochowski et al. ............ 712/240 |
| 5,604,877 | 2/1997 | Hoyt et al. ............ 712/243 |
| 5,606,682 | 2/1997 | McGarity ............ 711/204 |
| 5,623,614 | 4/1997 | Van Dyke et al. ............ 712/240 |
| 5,664,135 | 9/1997 | Schlansker et al. ............ 712/201 |
| 5,687,349 | 11/1997 | McGarity ............ 711/137 |
| 5,719,795 | 2/1998 | Menkus et al. ............ 703/2 |
| 5,768,576 | 6/1998 | Hoyt et al. ............ 712/238 |
| 5,850,543 | 12/1998 | Schiell et al. ............ 712/238 |

OTHER PUBLICATIONS

Kaeli et al., "Branch History Table Prediction of Moving Target Branches Due to Subroutine Returns", 1991 ACM 0-89791-394-9/91, pp. 34-41.
Yeh et al., "Increasing the Instruction Fetch Rate via Multiple Branch Prediction and a Branch Address Cache", The 7th ACM International Conference on Supercomputing, pp. 67-76, Jul. 19-23, 1993, Tokyo, Japan.

* cited by examiner

Primary Examiner—Daniel H. Pan
(74) Attorney, Agent, or Firm—F. Chau & Associates, LLP (57) ABSTRACT

A method and apparatus for prefetching superblocks in a computer processing system having a fetch mechanism for fetching instructions for execution includes the step of controlling the fetch mechanism to begin fetching at a starting address of a current superblock. A superblock includes a set of instructions in consecutive address locations terminated by a branch instruction known to have been taken. A Superblock Target Buffer (STB) is supplied with the starting address of the current superblock. The STB has a plurality of entries each indexed by a starting address of a superblock and including a run length of the superblock and a target address of the terminating branch of the superblock. The run length corresponds to the sum of a length of the terminating branch and the difference between a starting address of the terminating branch of the superblock and the starting address of the superblock. It is then determined whether or not the starting address of the current superblock supplied to the STB matches a starting address indexing an STB entry. A starting address of a next sequential superblock is determined by summing the starting address of the current superblock and the run length specified in the STB entry, when the starting address of the current superblock supplied to the STB matches the starting address indexing the STB entry. The fetch mechanism is controlled to end fetching at the starting address of the next sequential superblock.

25 Claims, 5 Drawing Sheets

FIG. 1

| Starting Address (SA) | Run Length (RL) | Predictor | Superblock Target (ST) |

FIG. 2

| Starting Address (SA) | RL1 | P1 | T1 | RL2 | P2 | T2 | RL3 | P3 | T3 | RL4 | P4 | T4 |

METHOD AND APPARATUS FOR PREFETCHING SUPERBLOCKS IN A COMPUTER PROCESSING SYSTEM

BACKGROUND

1. Technical Field

The present invention relates generally to computer processing systems and, in particular, to a method and apparatus for prefetching superblocks in a computer processing system.

2. Background Description

Early microprocessors generally processed instructions one at a time. Each instruction was processed using four sequential stages: instruction fetch; instruction decode; instruction execute; and result writeback. Within such microprocessors, different dedicated logic blocks performed each different processing stage. Each logic block waited until all the preceding logic blocks completed operations before beginning its operation.

Improved computational speed has been obtained by increasing the speed with which the computer hardware operates and by introducing parallel processing in one form or another. One form of parallel processing relates to the recent introduction of microprocessors of the "superscalar" type, which can effect parallel instruction computation. Typically, superscalar microprocessors have multiple execution units (e.g., multiple integer arithmetic logic units (ALUs)) for executing instructions and, thus, have multiple "pipelines". As such, multiple machine instructions may be executed simultaneously in a superscalar microprocessor, providing obvious benefits in the overall performance of the device and its system application.

For the purposes of this discussion, latency is defined as the delay between the fetch stage of an instruction and the execution stage of the instruction. Consider an instruction which references data stored in a specified register. Such an instruction requires at least four machine cycles to complete. In the first cycle, the instruction is fetched from memory. In the second cycle, the instruction is decoded. In the third cycle, the instruction is executed and, in the fourth cycle, data is written back to the appropriate location.

To improve efficiency and reduce instruction latency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock pulse the result of each processing stage is passed to the subsequent processing stage. Microprocessors that use the technique of overlapping the fetch, decode, execute, and writeback stages are known as "pipelined" microprocessors. In principle, a pipelined microprocessor can complete the execution of one instruction per machine cycle when a known sequence of instructions is being executed. Thus, it is evident that the effects of the latency time are reduced in pipelined microprocessors by initiating the processing of a second instruction before the actual execution of the first instruction is completed.

In general, instruction flow in a microprocessor requires that the instructions are fetched and decoded from sequential locations in a memory. Unfortunately, computer programs also include branch instructions. A branch instruction is an instruction that causes a disruption in this flow, e.g., a taken branch causes decoding to be discontinued along the sequential path, and resumed at a new location in memory. The new location in memory may be referred to as a target address of the branch. Such an interruption in pipelined instruction flow results in a substantial degradation in pipeline performance.

There are various types of branch instructions. One type of branch instruction is known as an unconditional branch in that it unconditionally transfers control from the branch instruction to the target instruction. That is, at the time that the branch instruction is decoded, it is known that the transfer of control to the target instruction will take place. Examples of unconditional branches include subroutine CALL/RETURN and GOTO. In terms of performance, a more costly branch instruction is known as a conditional branch. This instruction specifies that control is to be transferred to the target instruction only if some condition, as determined by the outcome of a previous instruction, is met. Examples of conditional branch constructs include the DO LOOP and the IF/THEN/ELSE.

Unconditional branches, such as subroutine CALL/RETURN and GOTO, are always taken. Thus, their behavior seems easy to predict. On the other hand, conditional branching constructs, such as the DO LOOP and the IF/THEN/ELSE block, do not always follow the same path. In actuality, a DO LOOP is a fairly well-behaved structure, usually resulting in a taken branch to a destination at a negative displacement off the program counter. However, the IF/THEN/ELSE block may not exhibit predictable behavior since it may change direction on subsequent iterations.

If it can be determined at instruction decode time that a conditional branch instruction will not be taken, then there is no penalty associated with the execution of the conditional branch instruction. That is, the next sequential instruction may be decoded immediately following the decoding of the branch instruction. However, if it is determined that the branch will be taken, a multi-cycle penalty associated with the branch is incurred in that the target address must be generated and the target instruction must be fetched.

Accordingly, many pipelined microprocessors use branch prediction mechanisms that predict the existence (i.e., taken or not taken) and the outcome of branch instructions within an instruction stream. The instruction fetch unit uses the branch predictions to fetch subsequent instructions.

When a branch prediction mechanism predicts the outcome of a branch instruction and the microprocessor executes subsequent instructions along the predicted path, the microprocessor is said to have "speculatively executed" along the predicted instruction path. During speculative execution the microprocessor is performing useful processing if the branch instruction was predicted correctly.

However, if the branch prediction mechanism mispredicted the branch instruction, the microprocessor is executing instructions down the wrong path and, thus, accomplishes nothing. When the microprocessor eventually detects the mispredicted branch, the microprocessor must flush the instructions that were speculatively fetched from the instruction pipeline and restart execution at the correct address. The effect of the above described non-sequential operation, and of the resultant flushing of the pipeline, is exacerbated in the case of superscalar pipelined microprocessors. For example, if a branch or other interruption in the sequential instruction flow of the microprocessor occurs, the number of lost pipeline slots, or lost execution opportunities, is multiplied by the number of parallel execution units (i.e., parallel pipelines). The performance degradation due to branches and corresponding non-sequential program execution is therefore amplified in superscalar pipelined microprocessors.

Thus, when the number of stages in a processor pipeline increases, the latency between the instruction execute stage and the instruction fetch stage becomes longer. This causes an increased delay in the launching of instructions after a conditional branch which depends on the execution of a prior instruction. Unless useful work can be inserted between the instructions and the conditional branch by the compiler, the delay results in lost cycles.

To reduce the number of lost cycles, especially in the common situation where the compiler is unable to insert more than a couple of instructions during the time in which the branch instruction is being resolved, it is necessary for the hardware to accurately anticipate (predict) the result of executing a particular branch and fetch instructions along the appropriate stream. When the prediction is correct, lost cycles are avoided. However, when the prediction is incorrect, it is possible that the number of lost cycles is greater than if no prediction was attempted. It therefore becomes essential to increase the success rate of the predictions.

Prediction techniques have included the use of Branch History Tables (BHTs) and Branch Target Buffers (BTBs). In its simplest form, a BHT maintains the outcomes of previously executed branches. The table is accessed by the instruction prefetch unit and decides whether prefetching should be redirected or not. The table is searched for a valid entry, just as a cache is searched. The table is typically set-associative, as is the case with many cache organizations. An entry is only added to the table when a taken branch is executed by the processor. On each BHT hit, the historical information in that entry is used by the prediction algorithm. The algorithm redirects prefetching for a taken prediction, or continues with the next sequential instruction for a not-taken prediction. Some implementations invalidate the entry when the branch changes to not taken. In this case, a BHT miss will occur subsequently, and next-sequential prefetching will ensue. If the prediction is wrong, the processor must be equipped with a back-out strategy to restore the necessary state. The use of BHTs is not without deficiency. For example, one problem with a conventional BHT is that it is typically indexed by the address of the branch that is to be predicted. This implies that the stream of instructions fetched from the cache has to be decoded to detect a branch before the prediction can be made. The decoding of instructions could possibly be done multiple instructions at a time when the instruction length is fixed. In some instruction sets where instructions are variable in length, this is a bigger problem.

Conventional BTBs are cache-like buffers that are used in the fetch units of microprocessors to store an identifier of a previously performed branch instruction as a tag, along with the target address (i.e., the address to which the branch points in its predicted state) and an indication of the branch's history. Upon subsequent fetches of the branch, the target address is used (depending on the branch history) as the next address to fetch in the pipeline. Upon execution of the branch instruction itself, the target address is compared against the actual next instruction address determined by the execution unit to verify whether the speculative execution was valid. However, the use of BTBs is not without deficiency. For example, as with the BHT, a BTB indexed using the address of the branch is able to provide the address of the target only when the branch is decoded in the instruction stream.

Thus, it would be desirable and highly advantageous to have a method and apparatus for accurately predicting the existence and the outcome of branch instructions within an instruction stream.

SUMMARY OF THE INVENTION

The present invention is directed to a method and apparatus for prefetching superblocks in a computer processing system.

In one aspect of the present invention, a method for prefetching superblocks in a computer processing system having a fetch mechanism for fetching instructions for execution includes the step of controlling the fetch mechanism to begin fetching at a starting address of a current superblock. A superblock includes a set of instructions in consecutive address locations terminated by a branch instruction known to have been taken. A Superblock Target Buffer (STB) is supplied with the starting address of the current superblock. The STB has a plurality of entries each indexed by a starting address of a superblock and including a run length of the superblock and a target address of the terminating branch of the superblock. The run length corresponds to the sum of a length of the terminating branch and the difference between a starting address of the terminating branch of the superblock and the starting address of the superblock. It is then determined whether or not the starting address of the current superblock supplied to the STB matches a starting address indexing an STB entry. A starting address of a next sequential superblock is determined by summing the starting address of the current superblock and the run length specified in the STB entry, when the starting address of the current superblock supplied to the STB matches the starting address indexing the STB entry. The fetch mechanism is controlled to end fetching at the starting address of the next sequential superblock.

In another aspect of the present invention, an apparatus for prefetching superblocks in a computer processing system, wherein a superblock comprises a set of instructions in consecutive address locations terminated by a branch instruction known to have been taken, includes a superblock target buffer (STB). The STB has a plurality of entries each indexed by a starting address of a superblock and including a run length of the superblock and a target address of the terminating branch of the superblock. The run length corresponds to the sum of a length of the terminating branch and the difference between a starting address of the terminating branch and the starting address of the superblock. An instruction execute unit supplies the STB with the starting address of the current superblock. A fetch mechanism fetches instructions beginning at a starting address of a current superblock, and ends the fetching of instructions at the address corresponding to the sum of the starting address of the current superblock and a run length specified in an STB entry when the starting address of the current superblock supplied to the STB matches a starting address indexing the STB entry.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for prefetching superblocks in a computer processing system. The present invention provides a high branch prediction success rate and efficient instruction-cache access.

To facilitate a clear understanding of the present invention, definitions of terms employed herein will now be given. A superblock is a set of instructions in consecutive address locations terminated by a branch that is known to have been taken. Thus, branches that are never taken in the course of an execution cannot terminate a superblock. A superblock is formed whenever the target of a taken branch is not already the start of an existing superblock. A superblock is associated with a starting address, a run-length, a predictor, and a target address. The run-length determines the length of the superblock and can be used for early computation of the address of the terminating branch. The predictor determines whether or not the terminating branch should be presumed taken. If the predictor determines that the branch should be presumed taken, then the target address points to the predicted next superblock.

A general description of the present invention will now be provided to introduce the reader to the concepts of the invention. Subsequently, more detailed descriptions of various aspects of the invention will be provided.

The central unit of the present invention is a Superblock Target Buffer (STB) which is essentially a set-associative cache. Unlike a traditional Branch Target Buffer (BTB) which is indexed by the address of a branch and includes an entry which contains information about the likely target of the branch, the STB is indexed (tagged) by the starting address of a "superblock" and the information contained in each entry includes the run length of the superblock, the address of the predicted next superblock (i.e., the target address), and the predictor (for the terminating branch of the superblock). The predictor is an optional entry in the STB and, thus, may be omitted therefrom. In particular, the predictor entry in the STB may be omitted in the case when information in the instruction, such as the opcode, the sign of the displacement, or hint bits, are used to predict the direction of a branch.

The cache line (i.e., fixed-sized region of memory) containing a superblock is accessed simultaneously with the superblock entry in the STB. Depending on the superblock run-length (RL), additional sequential cache lines continue to be fetched. If the predictor indicates a fall-through for the terminating branch (i.e., that the terminating branch should not be presumed taken), then the superblock entry in the STB corresponding to the fall-through address is accessed and additional sequentially addressed cache lines continue to be fetched as necessary. On the other hand, for a taken terminating branch, the STB entry and the cache line corresponding to the target address are accessed. This sequence of cache access is more streamlined than that typically used with a BTB, where the early determination of the predicted fetch pattern is not as straightforward. In the case of a BTB, for example, the actual branch must be recognized before the target can be fetched. This may need all intermediate instructions to be decoded as in the case of an instruction set with variable length instructions.

Figure 1:
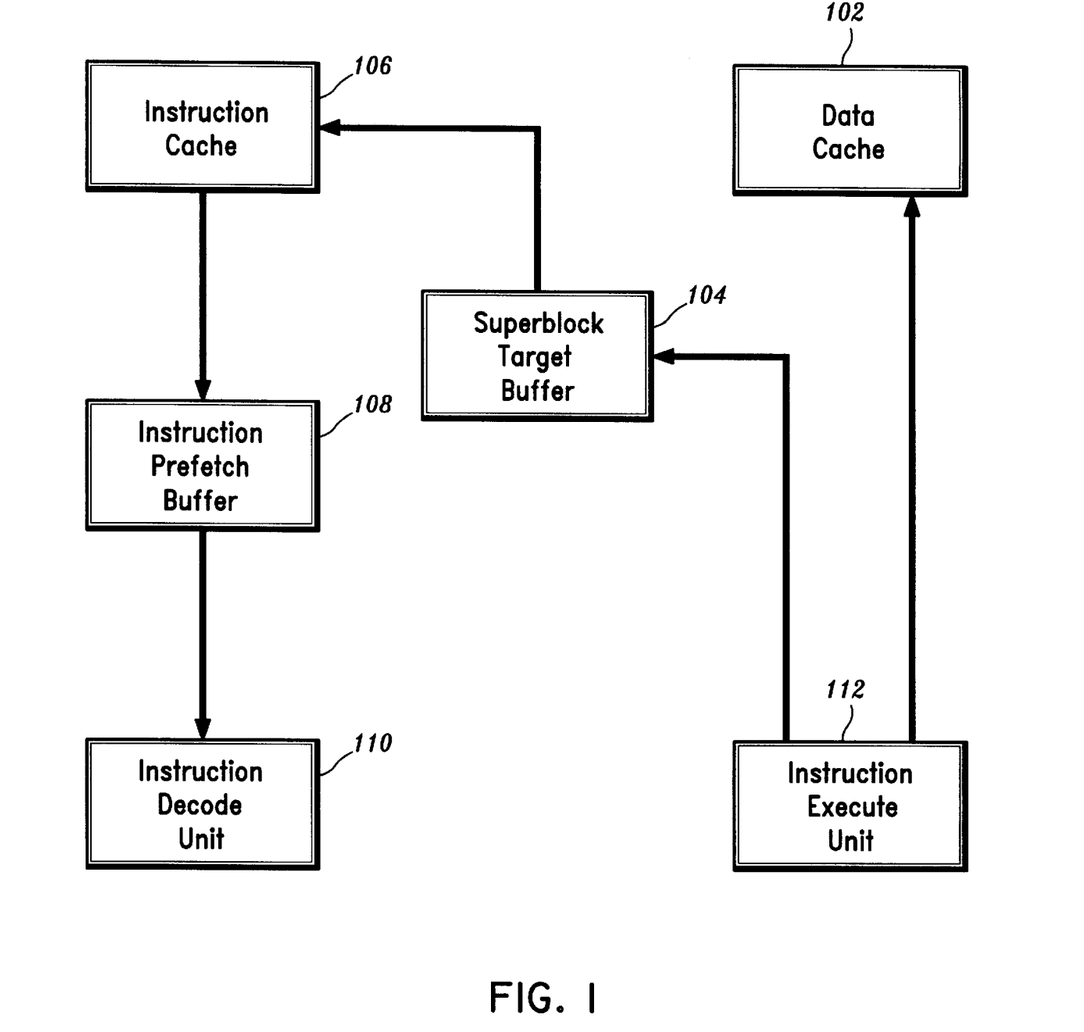
FIG. 1 is a block diagram of a computer processing system provided with hardware resources to support prefetching of superblocks according to an embodiment of the present invention.

FIG. 1 is a block diagram of a computer processing system provided with hardware resources to support prefetching of superblocks according to an embodiment of the present invention. The system 100 includes: a data cache 102; a superblock target buffer (STB) 104; an instruction cache (I-cache) 106; an instruction prefetch buffer 108; an instruction decode unit 110; and an instruction execute unit 112.

Instructions are fetched from instruction cache 106 from addresses specified by STB 104. The fetched instructions are deposited in instruction prefetch buffer 108. Then, the instructions are taken sequentially from prefetch buffer 108 for decoding by instruction decode unit 110, and executed in instruction execute unit 112.

In the course of execution, a branch instruction may be encountered. Execution of a branch instruction includes determining the direction of the branch and the target address of the branch. Information about this branch, including its address, whether or not it was taken, and the address of the instruction following the branch are dispatched to STB 104. This information is used to: confirm an earlier prediction for the branch; generate addresses for subsequent fetches from instruction cache 106; and update the prediction tables in STB 104.

A detailed description of an illustrative embodiment of the present invention will now be given. In the embodiment, the STB is a set-associative 1024×4 cache, and the predictor is a 2-bit saturating up-down counter.

However, it is to be appreciated that other history or direction predictors could also be employed in accordance with the present invention.

Figure 2:
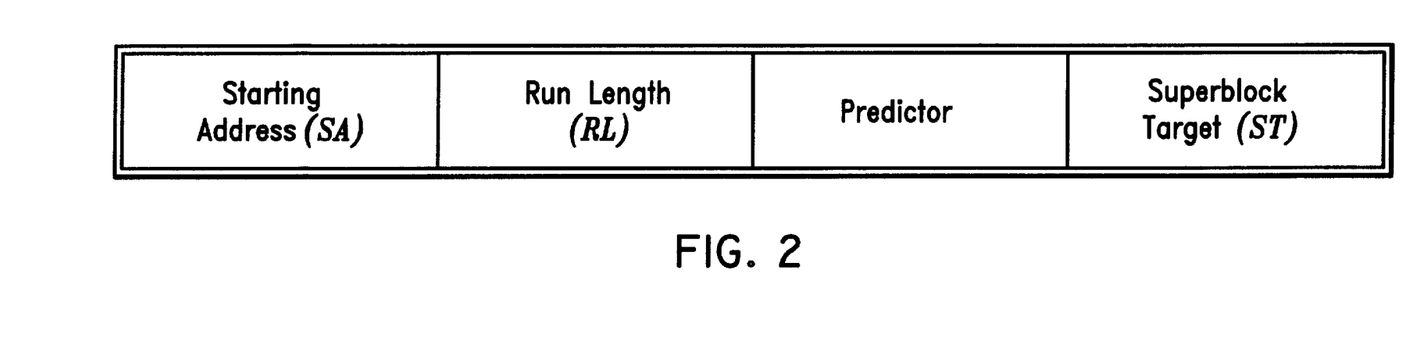
FIG. 2 is a diagram illustrating the various fields of a superblock target buffer (STB) according to an embodiment of the present invention.

FIG. 2 is a diagram illustrating the various fields of STB 104 according to an embodiment of the present invention. The fields corresponding to each entry in STB 104 include: a run length (RL) field; a predictor field; and a superblock target (ST) field. The starting address (SA) of a superblock is the identifier for each entry in STB 104.

The run length (RL) is the length of the superblock, and corresponds to the difference between the starting address of the next instruction immediately following the superblock (e.g., the next sequential superblock) and the starting address (SA) of the superblock. Thus, the sum of SA and RL provides the address of the location immediately following the superblock. The superblock target (ST) corresponds to the address of the next superblock, if the terminating branch is predicted to be taken (by the predictor). The predictor, i.e., the 2-bit saturating counter, is interpreted as shown in Table 1.

TABLE 1

| 00, 01 | target is fall-through address (i.e., SA + RL) |
| 10, 11 | target is provided by superblock target (ST) field |

Assume that the currently executing superblock with starting address SA does not have an entry in the STB. Cache lines continue to be fetched sequentially until a taken branch at address BA is encountered. At this point a new entry is stored in the STB which is indexed by address SA. The entry is updated by setting the predictor to a weakly taken state, the run length is set to the difference of BA and SA plus the length of the branch instruction ((BA−SA)+ branch instruction length), and the target address is set to the target address of the taken branch (TA). A new superblock starts at this address (TA).

If the address corresponding to SA already has an entry e in the STB, then a number of sequential cache lines, starting at the line corresponding to SA and continuing through to the cache line containing the address SA+ the predicted length (i.e., RL), is scheduled to be fetched from instruction cache 106. The process is repeated for the next superblock addressed by the predicted target of entry e.

The predictor and target address (ST) of an entry is updated at the end of the execution of the superblock. The counter value of the predictor is incremented when the terminating branch of the superblock is taken and decremented when the terminating branch is not taken. For a 2-bit saturating counter, the count is limited to 0 on the low side and 3 on the high side. If the branch was taken, the target address is updated to the most recent target address.

A superblock could terminate before reaching the end because of a previously unencountered branch in the superblock. In this case, the superblock is cut short at this point by modifying the run-length (RL) field of the superblock entry. The predictor value is set to weakly taken. A new entry may be created corresponding to the second part of the shortened STB entry. However, it may be preferable to create such an entry only if it is encountered again.

In the illustrative embodiment, the entry point of the superblock is its starting address. The superblock has a single exit point, that being the terminating branch instruction known to have been taken. There may exist intermediate branch instructions, however, all such corresponding branches may not have been taken.

Figure 3:
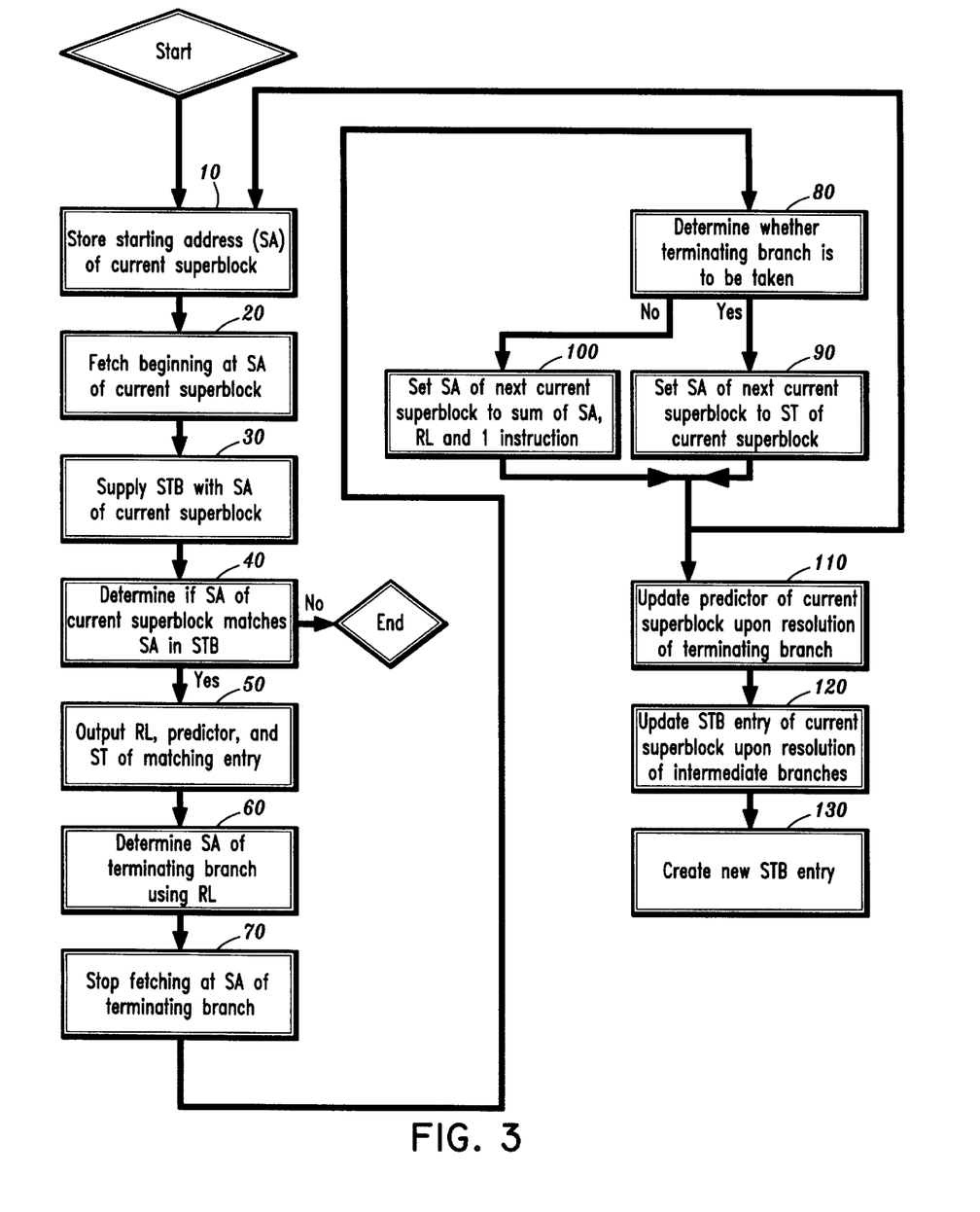
FIG. 3 is a flow chart of a method for prefetching superblocks in a computer processing system according to an embodiment of the present invention.

FIG. 3 is a flow chart of a method for prefetching superblocks in a computer processing system according to an embodiment of the present invention. The computer processing system includes a fetch mechanism comprising instruction prefetch buffer 108 shown in FIG. 1. The computer processing system also includes an STB having entries as shown in FIG. 2. The starting address (SA) of the current superblock is stored in a processor register (step 10). The fetch mechanism is controlled to begin fetching at the starting address (SA) of the current superblock (step 20). The STB 104 is supplied with the starting address (SA) of the current superblock (step 30).

It is then determined whether there is a matching entry in STB 104 (step 40). That is, it is determined whether the starting address (SA) of the current superblock supplied to STB 104 matches a starting address (of a superblock) used to index an entry in STB 104. If a matching entry is found in STB 104, then the method continues to step 50. Otherwise, the method terminates.

At step 50, the run length (RL), predictor, and target address (ST) of the matching entry is output from STB 104 to the fetch mechanism. The starting address of the next sequential superblock is then determined using the run length (RL) specified in STB 104 (step 60). That is, the starting address of the next sequential superblock is determined by summing the starting address (SA) of the current superblock and the run length (RL) specified in STB 104. The fetch mechanism is controlled to end fetching at the starting address of the next sequential superblock, as determined at step 60 (step 70).

It is then determined whether the terminating branch of the current superblock is predicted to be taken or not taken using the predictor specified in STB 104 (step 80). If the terminating branch is predicted to be taken at step 80, then the starting address (SA) of a next current superblock is set to the target address (ST) specified in the STB entry for the current superblock (step 90). However, if the terminating branch is predicted to not be taken at step 80, then the starting address (SA) of the next current superblock is set to the sum of the starting address (SA) of the current superblock and the run length of the current superblock (step 100).

Steps 20 through 100 are repeated for the next current superblock, using the starting address set at step 90 or step 100 (depending on whether the terminating branch of the current superblock was predicted to be taken or not taken, respectively).

Upon the resolution of the terminating branch instruction of the current superblock, the predictor of the current superblock should be updated (step 110). This may be performed, for example, by incrementing the saturating up-down counter.

Upon the resolution of any intermediate branches of the current superblock, the STB entry for the current superblock is updated (step 120). In particular, the old run length is saved in a separate register RLO, and the run length (RL) of the current superblock is set to the difference of the starting address of the instruction immediately following the resolved intermediate branch of the current superblock and the starting address (SA) of the current superblock (step 120a). The run length (RL) of the current superblock is also saved in a register RLN. The predictor is initialized such that the target address (ST) of the current superblock is set to the target address of the resolved intermediate branch (step 120b).

Additionally, a new STB entry is created for the current superblock (corresponding to the resolved intermediate branch) having a starting address (SA) corresponding to the sum of the starting address of the resolved intermediate branch and the length of the resolved intermediate branch (step 130). The run length (RL) of the new STB entry is set to the difference between the old and new run lengths (RLO−RLN) (step 130a). The predictor of the new STB entry is set to the predictor for the current superblock (step 130b). The target address (ST) of the new STB entry is set to the target address of the current superblock (step 130c).

A description of an extension of the prefetching method of the present invention which includes multiple instruction execution paths will now be given. Often, cache lines are fetched faster than they are consumed by the execution units of a processor(s). In order to reduce the penalty due to mispredicted branches, it would be useful to have some instructions from the mispredicted path available ahead of time. If the mispredicted path was the fall-through path and if instructions are fetched in quadword chunks, approximately two words of instructions are available on a misprediction. By fetching additional instructions from the taken path for the predicted fall-through cases, the same advantage could be obtained for the remaining cases. These instructions could be fetched with lower priority, that is, whenever the cache fetch gets far ahead of the instruction execution.

A description of superblock prefetching implemented with a call-return mechanism will now be given. Such a call-return mechanism is described in the patent application (IBM Docket No. YO999-013) entitled "Method and Apparatus for Call-Return Prediction", filed concurrently herewith, the disclosure of which is incorporated herein by reference.

Figure 4:
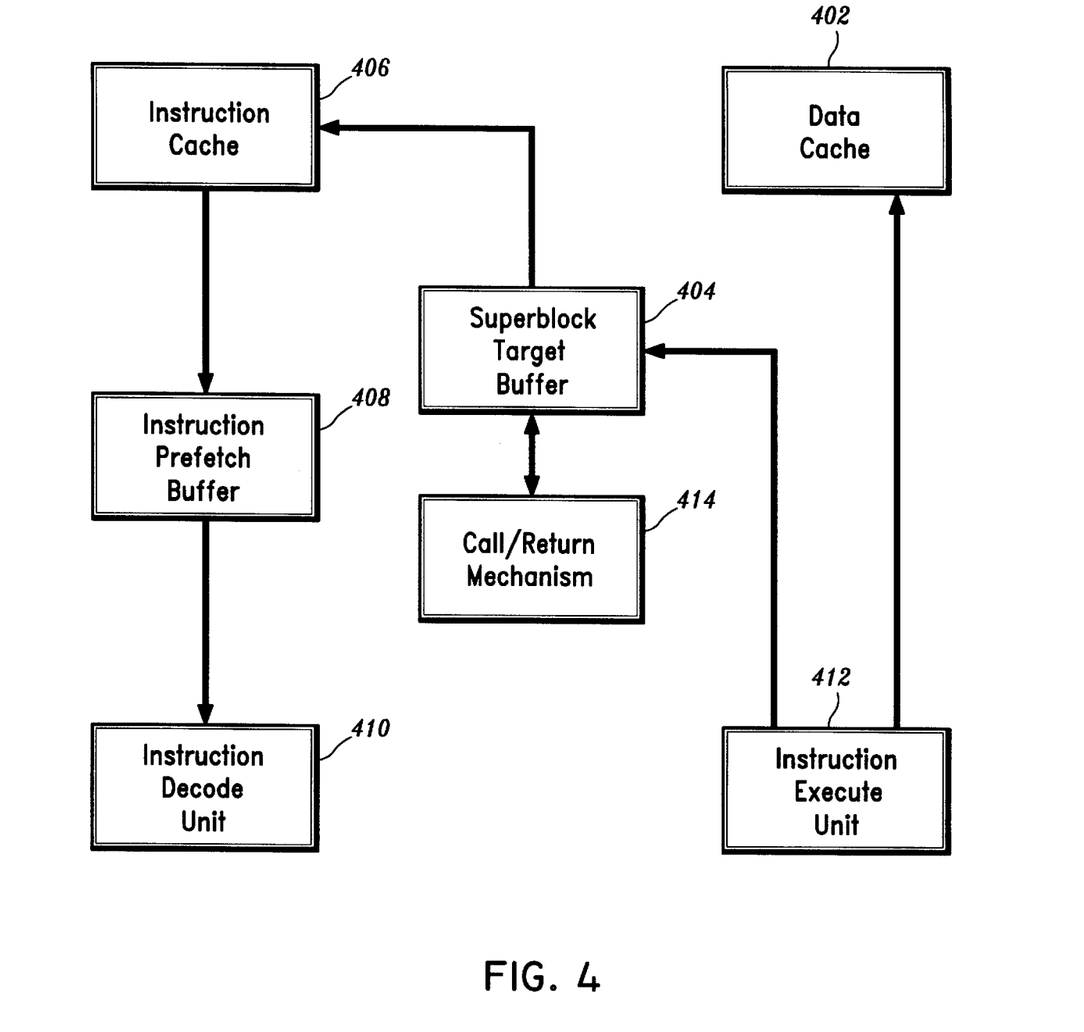
FIG. 4 is a block diagram of a computer processing system provided with hardware resources to support prefetching of superblocks according to another embodiment of the present invention.

FIG. 4 is a block diagram of a computer processing system provided with hardware resources to support prefetching of superblocks according to another embodiment of the present invention. The system 400 includes: a data cache 402; a superblock target buffer (STB) 404; an instruction cache (I-cache) 406; an instruction prefetch buffer 408; an instruction decode unit 410; an instruction execute unit 412; and a call/return mechanism 414. The call/return mechanism includes a call buffer and a return cache (not shown).

Instead of storing the starting address of the return instruction, we store the starting address of the superblock containing the return instruction both in the Call Buffer and Return Cache of call/return mechanism 414. This allows the point to which the subroutine returns to be anticipated even before the return instruction is seen, thus allowing an early fetch of instructions from the caller.

Figure 5:
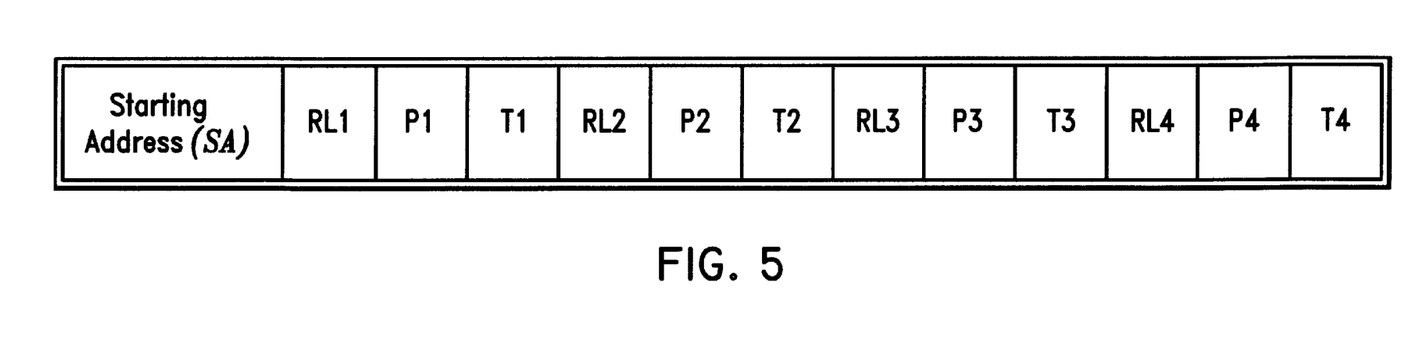
FIG. 5 is a diagram illustrating the various fields of a superblock target buffer (STB) according to another embodiment of the present invention.

FIG. 5 is a diagram illustrating the various fields of a superblock target buffer (STB) according to another embodiment of the present invention. In the embodiment, the definition of a superblock is extended to include multiple-exit situations (while still having a single-entry). In such a case, a superblock is defined as a set of instructions in consecutive address locations terminated by a branch instruction known to have been taken, the set of instructions including intermediate branch instructions known to have been taken.

The STB includes a plurality of entries each indexed by a starting address of a superblock and including m triples. Each triple corresponds to a (taken) branch instruction (i.e., either an intermediate branch instruction or the terminating branch instruction) and includes a run length, a predictor (e.g., a 2-bit saturating counter), and a target address. The run length corresponds to the sum of the length of a branch instruction and the difference between the starting address of the instruction immediately following the branch instruction and the starting address of the superblock. The predictor indicates whether the branch instruction is to be presumed taken. The target address corresponds to the target of the branch instruction, when the branch instruction is predicted to be taken.

The STB shown in FIG. 5 corresponds to the case when there are four possible exits in a single entry of the STB. However, anyone skilled in the art may easily modify the following described method to cover more or less than four possible exits. The fields corresponding to each entry in the STB include: an RLm field corresponding to the run length for exit m; a Pm field corresponding to the predictor for exit m; and a Tm field corresponding to the target address for exit m, when the exit m is predicted to be taken. The starting address (SA) of a superblock is the identifier for each entry in the STB.

To provide a clear understanding of the embodiment of FIG. 5, assume that SA, RL1, P1, T1 correspond to one of the entries in the STB of FIG. 2. When an intermediate branch is taken, {RL1, P1, T1} is copied over to {RL2, P2, T2} and a new exit point (corresponding to the intermediate branch) is placed with the triple {RL1, P1, T1}, where RL1 is the run length of the block starting at SA and terminating at the instruction immediately following the newly taken intermediate branch, P1 is the predictor for this superblock (terminated by the intermediate branch), and T1 is the target for this superblock, if the intermediate branch is predicted to be taken. This avoids the need to break up the original superblock into two entries. If yet another branch later happens to be taken before the branch at RL1 the existing entries (1 and 2) are moved over to make space for a new entry. If a branch happens to be taken after the one at RL1, only {RL2, P2, T2} get moved over to make room for a new entry. Note that exit m in a superblock does not necessarily correspond to branch m in the superblock, because branches which have never been taken will not have a corresponding exit.

Figure 6:
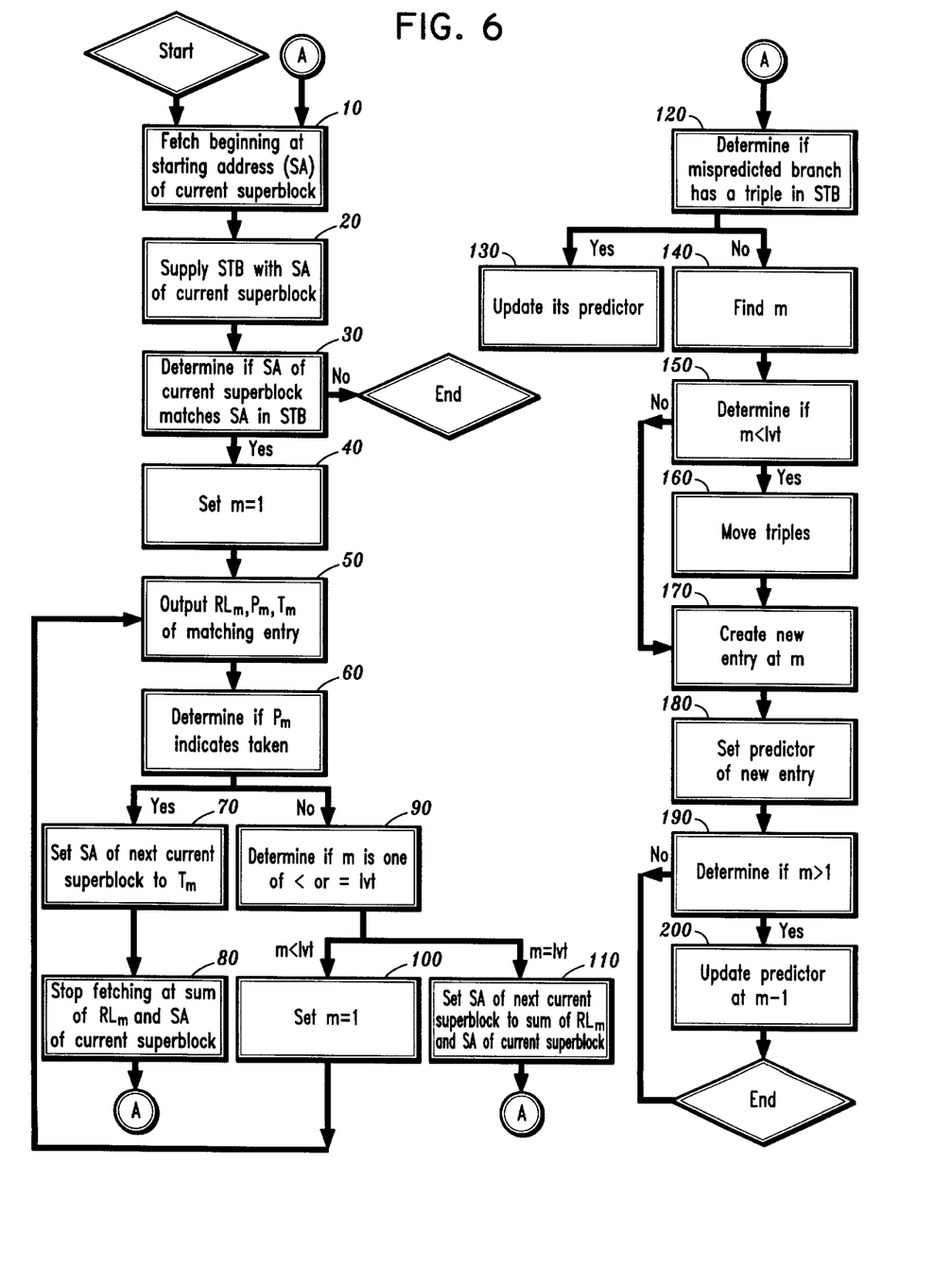
FIG. 6 is a flow chart of a method for prefetching superblocks in a computer processing system according to another embodiment of the present invention.

FIG. 6 is a flow chart of a method for prefetching superblocks in a computer processing system according to another embodiment of the present invention. In particular, the method of FIG. 6 corresponds to the STB of FIG. 5. It is to be appreciated that the method of FIG. 6 attempts to predict longer paths of execution than the method of FIG. 3. Unlike a trace-cache scheme or the DIF approach, this scheme does not store the actual instructions along the path, only the addresses from where the instructions should be fetched. For articles describing the trace-cache scheme and the DIF approach, respectively, see "Trace Cache: A Low Latency Approach to High Bandwidth Instruction Fetching", Bennett et al., Proceedings of the 29th International Symposium on Microarchitecture (November 1996); and "Exploiting Instruction Level Parallelism in Processors by Caching Scheduled Groups", Nair et al., Proceedings of the 24th International Symposium on Computer Architecture (June 1997).

The fetch mechanism is controlled to begin fetching at the starting address (SA) of the current superblock (step 10). The STB is supplied with the starting address (SA) of the current superblock (step 20).

It is then determined whether a matching entry is found (step 30). That is, it is determined whether the starting address (SA) of the current superblock supplied to the STB matches a starting address (of a superblock) used to index an entry in the STB. If a matching entry is found in STB 104, then m is set to 1 (step 40) and the method continues to step 50. Otherwise, the method terminates.

At step 50, RLm, Pm, and Tm of the matching entry is output from the STB to the fetch mechanism. It is then determined whether the predictor for the $m^{th}$ triple (i.e., Pm) indicates that the corresponding branch instruction is to be presumed "taken" (step 60). If so, then the starting address (SA) of the next current superblock is set to Tm (step 70), and the fetch mechanism is controlled to end fetching at the address corresponding to the sum of RLm and the starting address of the current superblock (step 80).

However, if the predictor for the $m^{th}$ triple (i.e., Pm) indicates that the corresponding branch instruction is not to be presumed "taken", then it is determined whether m is either less than or equal to a value corresponding to a last valid triple (lvt) (step 90). If m is less than the value corresponding to a last valid triple, then m is set to the sum of m and 1 and a return is made to step 50 (step 100). However, if m is equal to the value corresponding to the last valid triple, then the starting address of the next current superblock is set to the sum of the starting address of the current superblock and the run length of the $m^{th}$ triple. (step 110).

Steps 10 through 110 are repeated for the next current superblock, using the starting address set at step 70 or step 110.

The following example describes the case when a misprediction is detected (upon resolution of a superblock). In the example, the number of entries in STB 404 and, thus, the number of exits for a particular superblock, is limited to 4. However, it is to be appreciated that the preceding scheme may be readily modified by anyone skilled in the art to include more or less than the 4 exits described in the corresponding example.

It is determined whether the mispredicted branch has a corresponding triple in the STB entry (step 120). If so, then its predictor is updated (step 130). Otherwise, an m is found in STB 104 such that the run length of the $m^{th}$ triple corresponds to a branch subsequent to a new branch to be entered (step 140).

Next, it is determined whether the m found at step 130 is less than 4 (the number corresponding to the last valid triple) (step 150). If not, then the method proceeds to step 170, since m must be equal to 4. In this case, the 4th triple simply gets "pushed" out of the list. Otherwise, the triples starting at m are moved to consecutive positions starting at m+1 (step 160). Note that this may drop the entry at location 4 if it exists. A new entry is then created at m corresponding to the new branch (step 170). The predictor for the new branch is set to weakly taken (step 180).

Next, it is determined if m is greater than 1 (step 190). If so, then the predictor for the branch at m−1 is updated (step 200). Otherwise, the method terminates.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for prefetching superblocks in a computer processing system having a fetch mechanism for fetching instructions for execution, comprising the steps of:
   (a) controlling the fetch mechanism to begin fetching at a starting address of a current superblock, wherein a superblock includes a set of instructions in consecutive address locations terminated by a branch instruction known to have been taken;
   (b) supplying a Superblock Target Buffer (STB) with the starting address of the current superblock, the STB having a plurality of entries each indexed by a starting address of a superblock and including a run length of the superblock and a target address of the terminating branch of the superblock, the run length corresponding to a sum of a length of the terminating branch and a difference between a starting address of the terminating branch of the superblock and the starting address of the superblock;
   (c) determining whether the starting address of the current superblock supplied to the STB matches a starting address indexing an STB entry;
   (d) determining a starting address of a next sequential superblock by summing the starting address of the current superblock and the run length specified in the STB entry, when the starting address of the current superblock supplied to the STB matches the starting address indexing the STB entry; and
   (e) controlling the fetch mechanism to end fetching at the starting address of the next sequential superblock.

2. The method according to claim 1, further comprising the step of storing the starting address of the current superblock in a processor register, before said step of controlling the fetch mechanism to begin fetching.

3. The method of claim 1, further comprising the step of repeating steps (a) through (e) for a next current superblock.

4. The method of claim 3, wherein the next current superblock corresponds to the next sequential superblock.

5. The method of claim 1, wherein each of the plurality of entries in the STB further comprises a predictor, the method further comprising the steps of:
   determining whether the terminating branch of the current superblock is taken using a predictor specified in the STB entry;
   setting the starting address of the next current superblock to the target address specified in the STB entry, when the terminating branch is predicted to be taken; and
   setting the starting address of the next current superblock to a sum of the starting address of the current superblock and the run length of the current superblock, when the terminating branch is predicted to not be taken.

6. The method of claim 5, further comprising the step of updating the predictor of the current superblock, upon resolution of the terminating branch instruction.

7. The method according to claim 6, wherein said step of updating the predictor comprises the steps of:
   incrementing a counter value, when the terminating branch is taken; and
   decrementing the counter value, when the terminating branch is not taken.

8. The method of claim 1, further comprising the step of updating the STB entry for the current superblock, upon resolution of an intermediate branch.

9. The method of claim 8, wherein said step of updating the STB entry for the current superblock comprises the steps of:
   setting the run length of the current superblock to the difference of the starting address of the current superblock and a starting address of an instruction immediately following the resolved intermediate branch; and
   initializing the predictor of the current superblock such that the target address of the current superblock is set to a target address of the resolved intermediate branch.

10. The method of claim 8, further comprising the step of creating a new STB entry for the current superblock corresponding to the resolved intermediate branch and having a starting address corresponding to a sum of the starting address of the resolved intermediate branch and a length of the resolved intermediate branch.

11. The method of claim 10, wherein said step of creating a new STB entry for the current superblock comprises the steps of:
   setting a run length of the new STB entry to a difference between the run length corresponding to the current superblock prior to the resolution of the intermediate branch and the run length corresponding to the current superblock following the resolution of the intermediate branch;
   setting the predictor of the new STB entry to the predictor for the current superblock; and
   setting the target address of the new STB entry to the target address of the current superblock.

12. An apparatus for prefetching superblocks in a computer processing system, wherein a superblock comprises a set of instructions in consecutive address locations terminated by a branch instruction known to have been taken, the apparatus comprising:
   a superblock target buffer (STB) having a plurality of entries each indexed by a starting address of a superblock and including a run length of the superblock and a target address of the terminating branch of the superblock, the run length corresponding to a sum of a length of the terminating branch and a difference between a starting address of the terminating branch and the starting address of the superblock;

an instruction execute unit for supplying said STB with the starting address of the current superblock; and a fetch mechanism for fetching instructions beginning at a starting address of a current superblock, and ending the fetching of instructions at the address corresponding to a sum of the starting address of the current superblock and a run length specified in an STB entry when the starting address of the current superblock supplied to the STB matches a starting address indexing the STB entry.

13. The apparatus according to claim 12, wherein said STB is a set-associative cache.

14. The apparatus according to claim 12, wherein each STB entry further comprises a predictor for indicating whether the terminating branch instruction is predicted to be taken.

15. A method for prefetching superblocks in a computer processing system having a fetch mechanism for fetching instructions for execution, comprising the steps of:

(a) controlling the fetch mechanism to begin fetching at a starting address of a current superblock, wherein a superblock includes a set of instructions in consecutive address locations terminated by a branch instruction known to have been taken, the set of instructions including intermediate branch instructions known to have been taken;

(b) supplying a Superblock Target Buffer (STB) with the starting address of the current superblock, wherein the STB comprises a plurality of entries each indexed by a starting address of a superblock and including m triples, each triple corresponding to a branch instruction and including a run length corresponding to a sum of a length of the branch instruction and a difference between a starting address of the branch instruction and the starting address of the superblock, a predictor for indicating whether the branch instruction is predicted to be taken, and a target address of the branch instruction;

(c) setting the m equal to 1, when the starting address of the current superblock supplied to the STB matches a starting address indexing the STB entry;

(d) determining whether the predictor for the $m^{th}$ triple indicates that the branch is predicted to be taken; and (e) controlling the fetch mechanism to end fetching an address corresponding to a sum of the starting address of the current superblock and a run length of the $m^{th}$ triple, when the predictor for the $m^{th}$ triple indicates that the branch is predicted to be taken.

16. The method according to claim 15, further comprising the step of:

setting the starting address of a next current superblock to a target address of the $m^{th}$ triple and returning to said step of controlling the fetch mechanism to begin fetching, when the predictor for the $m^{th}$ triple indicates that the branch is predicted to be taken.

17. The method according to claim 15, wherein before said step of controlling the fetch mechanism to end fetching, the method further comprises the steps of:

setting the m equal to a sum of the m and 1 and returning to said determining step, when the predictor for the $m^{th}$ triple indicates that the terminating branch is predicted not to be taken and the m is less than a value corresponding to a last valid triple; and setting a starting address of a next superblock to an address corresponding to a sum of the starting address of the current superblock and the run length of the $m^{th}$ triple and returning to said step of controlling the fetch mechanism to begin fetching, when the predictor for the $m^{th}$ triple indicates that the terminating branch is predicted not to be taken and the m is equal to the value corresponding to the last valid triple.

18. The method according to claim 15, further comprising the step of updating the predictor of the $m^{th}$ triple, when resolution of the branch indicates a misprediction of the predictor of the mth triple.

19. The method according to claim 15, further comprising the step of identifying the m such that the run length of the $m^{th}$ triple corresponds to a branch subsequent to a new branch to be entered, when the branch is mispredicted and does not have a corresponding triple in the STB.

20. The method according to claim 19, further comprising the step of moving triples starting at a triple corresponding to the identified m to consecutive positions starting at a triple corresponding to the identified m+1, when the identified m is less than a value corresponding to the last valid triple.

21. The method according to claim 19, further comprising the step of creating a new entry at the m corresponding to a new branch.

22. The method according to claim 21, wherein said creating step comprises the step of setting the predictor of the new branch to weakly taken.

23. The method according to claim 21, wherein said creating step further comprises the step of updating the predictor for a branch corresponding to the $m^{th}-1$ triple, when the m is greater than one.

24. An apparatus for prefetching superblocks in a computer processing system, wherein a superblock comprises a set of instructions in consecutive address locations terminated by a branch instruction known to have been taken, the set of instructions including intermediate branch instructions known to have been taken, the apparatus comprising:

a superblock target buffer (STB) having a plurality of entries each indexed by a starting address of a superblock and including m triples, each triple corresponding to a branch instruction and including a run length corresponding to a sum of a length of the branch instruction and a difference between a starting address of the branch instruction and the starting address of the superblock, a predictor for indicating whether the branch instruction is predicted to be taken, and a target address of the branch instruction;

an instruction execute unit for supplying said STB with the starting address of the current superblock; and a fetch mechanism for fetching instructions beginning at a starting address of a current superblock, and ending the fetching of instructions at an address corresponding to a sum of the starting address of the current superblock and a run length of the $m^{th}$ triple when the predictor for the $m^{th}$ triple indicates that the branch is predicted to be taken.

25. The apparatus according to claim 24, wherein said STB is a set-associative cache.

* * * * *